(12) United States Patent
Aquino et al.

(10) Patent No.: US 9,946,096 B2
(45) Date of Patent: Apr. 17, 2018

(54) DECORATIVE ATTACHMENT FOR EYEWEAR TEMPLE

(71) Applicant: SHORELYS, LLC, Great Falls, VA (US)

(72) Inventors: Gabriel A. Aquino, Great Falls, VA (US); Kyle C. Stahley, Wilmington, DE (US)

( * ) Notice: Subject to any disclaimer, the term of this patent is extended or adjusted under 35 U.S.C. 154(b) by 0 days.

(21) Appl. No.: 15/353,956

(22) Filed: Nov. 17, 2016

(65) Prior Publication Data
US 2017/0068115 A1    Mar. 9, 2017

Related U.S. Application Data

(63) Continuation-in-part of application No. 29/531,508, filed on Jun. 26, 2015, now Pat. No. Des. 789,441.

(51) Int. Cl.
   *G02C 11/02*    (2006.01)
(52) U.S. Cl.
   CPC .......... *G02C 11/02* (2013.01); *G02C 2200/20* (2013.01)
(58) Field of Classification Search
   CPC .................................. G02C 2200/02
   USPC ...................................... 351/51, 52
   See application file for complete search history.

(56) References Cited

U.S. PATENT DOCUMENTS

| | | | |
|---|---|---|---|
| 3,582,192 A * | 6/1971 | Gitlin | G02C 11/02 351/111 |
| 5,110,198 A | 5/1992 | Travis et al. | |
| 5,500,693 A * | 3/1996 | Friedman | G02C 5/10 351/51 |
| 5,654,787 A * | 8/1997 | Barison | G02C 3/003 351/157 |
| 5,974,632 A | 11/1999 | Chang | |
| 7,677,721 B2 | 3/2010 | Siu | |
| 2012/0249946 A1 | 10/2012 | Burnstein | |
| 2015/0219932 A1 | 8/2015 | Chen | |
| 2015/0346518 A1 | 12/2015 | Levy et al. | |

FOREIGN PATENT DOCUMENTS

| | | |
|---|---|---|
| CN | 204143087 U | 2/2015 |
| EP | 2851736 A1 | 3/2015 |
| GB | 781093 A | 8/1957 |
| WO | 8910576 | 11/1989 |
| WO | 2015029215 | 3/2015 |

\* cited by examiner

*Primary Examiner* — Hung Dang
(74) *Attorney, Agent, or Firm* — Gearhart Law LLC

(57) ABSTRACT

It is provided a removable decorative attachment to one or both of the temple pieces of an eyewear. The decorative attachment to the temple of the eyewear can be of different shapes, colors, patterns and is made of a thermoplastic material, and retained onto the temple by friction or through a retaining mechanism built on both the attachment and the temple pieces of the eyewear.

19 Claims, 18 Drawing Sheets

DECORATIVE ATTACHMENT FOR EYEWEAR TEMPLE

CLAIM OF PRIORITY

This application is a continuation in part of U.S. patent application Ser. No. 29/531,508, filed on Jun. 26, 2015, the contents of which are hereby fully incorporated by reference in its entirety.

FIELD OF THE EMBODIMENTS

This invention relates to a decorative attachment for use on, at the least, one temple piece of a pair of eyeglasses and the corresponding retaining mechanism for such attachment on the temple piece.

BACKGROUND OF THE EMBODIMENTS

People are always attempting to create their uniqueness in enjoying their own lifestyle. In other word, they always try to look for different designs of body wear and eyewear to obtain a balance of mixing and matching with each other. It is, however, not practical for people to carry multiple pairs of eyewear, especially, different custom designed eyewear, at the same time. In addition, eyewear manufactures tend to mass produce limited variations of similar eyewear styles and designs due to constraints of manufacturing cost and other factors. Even though the appearance of various eyewear thus produced can be novel and aesthetic, there still lacks personality in individual, because people can only select eyewear created by eyewear designers but cannot create his or her own eyewear design.

There have been efforts to add decorative elements to eyewear, especially to the temple piece. Examples of related art are described below:

U.S. Pat. No. 5,110,198A to B. Travis et al., entitled "Eye wear with interlocking frame sections", pertains to a set of spectacles has a lens frame formed of a pair of releasably interlocking lens holding sections. Each lens holding section is adapted to hold a single lens and has a hinge connection on one side and a set of knuckles on the other side. The knuckles in each of the lens sections interlock with the knuckles in the other lens section to releasably join the lens sections together. A pair of primary hinge pin members couple the temple pieces to the lens holding sections. The primary hinge pin members are removable. The spectacles also include at least one spare hinge pin member removably seated in a receptacle defined in one of the temple pieces. At least one of the hinge pin members is provided with a decorative, exposed shield.

U.S. Pat. No. 7,677,721B2 to Y. Siu, entitled "Interchangeable decorative arrangement for spectacles", pertains to a spectacle frame includes two lenses, a frame body holding said two lenses in position, and an interchangeable decorative arrangement which includes one or more personalizing elements detachably and interchangeably affixing at a personalizing portion of the frame body, wherein the personalizing element, having a shape corresponding to the personalizing portion of said frame body, forms an add-on personal decorative item to personify the frame body so as to enhance an aesthetic appearance of the spectacle frame.

US Patent Application No. 20120075571A1 by M. Silver, entitled "Decorative arm sleeves for eyeglasses", pertains to an eyeglass frame system includes a lens frame, a planar side extension pivotally attached at opposite ends of the lens frame, and an integrated earpiece and temple frame, an end opposite to the earpiece portion including an elongate longitudinal channel complemental in cross-sectional geometry to that of the planar side pivotally attached to the lens frame. The temple and earpiece frame may be selectably inserted over the side extension.

US Patent Application No. 20150219932A1 by L. Chen, entitled "Glasses and temple unit thereof", pertains to a temple unit of a pair of glasses includes at least a temple, at least an adornment and at least a fastener. The temple has an adornment socket. The adornment is disposed in the adornment socket. The fastener is rotatable around the temple and fastens the adornment to the adornment socket.

None of the art described above addresses all of the issues that the present invention does. In the present invention, it is provided a removable decorative attachment to one or both of the temple pieces of an eyewear with as many as three or more on one temple piece. The decorative attachment to the temple of the eyewear can be of different shapes, colors, and patterns, bearing different logos, charities, or events. It is typically made of a thermoplastic material, and retained onto the temple by friction or through a retaining mechanism built on both the attachment and the temple pieces of the eyewear.

SUMMARY OF THE EMBODIMENTS

In one of the embodiments, the present invention provides a detachable decorative attachment for a temple of an eyewear, which comprises a main section having a top edge and a bottom edge; two first extensions that are disposed on the top edge and the bottom edge of the main section, and each of the first extension is perpendicular to the main section extending toward the back side. At the end edge of each of the first extensions, there further is a second extension that is perpendicular to the first extension and the two second extensions are facing towards each other, such that the main section, the first extensions and second extensions form two channel sections disposed on a top and a bottom sides of the main section for gripping a top edge and a bottom edge of the temple of the eyewear when the attachment is clipped onto the temple. When the attachment is clipped onto the temple, an outside surface of the main section faces outward and this outward-facing surface has a decorative shape and upon this outward-facing surface, an ornamental expression is applied or integrated.

According to this embodiment, the attachment is fastened onto the temple through friction between an inside surface of the attachment and at least three outer surfaces of the temple, and optionally, through an additional tension force exerted by an edge of a sidewall of the two channel sections constructed to press against an inside surface of the temple. The attachment is made of a thermoplastic material that is opaque, translucent or transparent, or has a solid color or multiple solid colors or color patterns and the thermoplastic material is selected from a group consisting of polycarbonate, polyethylene, acrylonitrile butadiene styrene (ABS), or nylon with or without a heat finish. The main section of the attachment is made into a general shape selected from a group consisting of square, trapezoid, rectangle, parallelogram, triangle, octagon, circle, and made with additional ornamental shapes thereon. The outward-facing surface of the main section of the attachment is made with an ornamental expression that is built thereon, or is added through a process, such as carving, etching, inkjet or LogoJet printing with or without a flexible or rigid finish, or engraving; or through further fastening a decorative element onto this outward-facing surface; or through having an aperture on this outward-facing surface to which a decorative element is selectively inserted.

In another of the embodiments, the present invention provides a detachable decorative attachment for a temple of an eyewear, which comprises a main section having a top edge and a bottom edge; two first extensions that are disposed on the top edge and the bottom edge of the main section, and each of the first extension is perpendicular to the main section extending toward the back side. At the end edge of each of the first extensions, there further is a second extension that is perpendicular to the first extension and the two second extensions are facing towards each other, such that the main section, the first extensions and second extensions form two channel sections disposed on a top a bottom sides of the main section for gripping a top edge and a bottom edge of the temple of the eyewear when the attachment is clipped onto the temple. Furthermore, there is provided an engagement mechanism interacting between the attachment and the temple so as to retain the attachment onto the temple. Similar to the above embodiment, an outside surface of the main section of the attachment faces outward when the attachment is clipped onto the temple. This outward-facing surface of the main section has a decorative shape and upon this outward-facing surface of the main section, an ornamental expression is applied or integrated.

One of the engagement mechanisms according to this embodiment is built into the channel section on the bottom side of the main section to interact with a receiving engagement mechanism formed within an inside surface on the temple. This engagement mechanism comprises a tongue extended from a top edge of the bottom channel towards a groove built into the inside surface of the temple such that the interaction helps to retain the attachment onto the temple.

Another of the engagement mechanisms according to this embodiment is built into the channel section on the bottom side of the main section to interact with a receiving engagement mechanism formed on the bottom edge of the temple. This engagement mechanism comprises a latch extended from within the bottom first extension on the attachment towards an aperture built into the bottom edge of the temple.

According to the second of the aforementioned embodiments, similar to the first aforementioned embodiment, the attachment is made of a thermoplastic material that is opaque, translucent or transparent, or has a solid color or multiple solid colors or color patterns and the thermoplastic material is selected from a group consisting of polycarbonate, polyethylene, acrylonitrile butadiene styrene (ABS), or nylon with or without a heat finish. The main section of the attachment is made into a general shape selected from a group consisting of square, trapezoid, rectangle, parallelogram, triangle, octagon, circle, and made with additional ornamental shapes thereon. The outward-facing surface of the main section of the attachment is made with an ornamental expression that is built thereon, or is added through a process, such as carving, etching, inkjet or LogoJet printing with or without a flexible or rigid finish, or engraving; or through further fastening a decorative element onto this outward-facing surface; or through having an aperture on this outward-facing surface to which a decorative element is selectively inserted.

In yet another of the embodiments, the present invention provides an eyewear frame system having one or more decorative elements affixed to one or both of the temple pieces. The eyewear frame system comprises an eyewear lens frame; a pair of temple pieces, each having a proximal end pivotally attached to an opposing respective side of the lens frame; and a detachable decorative attachment for one or both of the temple pieces, which comprises a main section having a top edge and a bottom edge; two first extensions that are disposed on the top edge and the bottom edge of the main section, and each of the first extension is perpendicular to the main section extending toward the back side. At the end edge of each of the first extensions, there further is a second extension that is perpendicular to the first extension and the two second extensions are facing towards each other, such that the main section, the first extensions and second extensions form two channel sections disposed on a top and a bottom sides of the main section for gripping a top edge and a bottom edge of the temple of the eyewear when the attachment is clipped onto the temple. When the attachment is clipped onto the temple, an outside surface of the main section faces outward and the outward-facing surface of the main section has a decorative shape and upon the outward-facing surface of the main section, an ornamental expression is applied or integrated.

In still another of the embodiments, there is provided in the above-mentioned eyewear frame system an engagement mechanism interacting between the attachment and at least one member of the pair of temple pieces. This interaction helps to retain the attachment onto the temple piece. One of such an engagement mechanism that is built into the bottom channel section of the attachment main section comprises a tongue extended from a top edge of the bottom channel towards a groove built into the inside surface of at least one member of the pair of temple pieces. Another of such engagement mechanism interacting between the attachment and at least one member of the pair of temple pieces comprises a latch extended from within the bottom first extension on the attachment towards an aperture built into the bottom side of the temple.

In an eyewear frame system as mentioned above, the main section of the attachment is made into a general shape selected from a group consisting of square, trapezoid, rectangle, parallelogram, triangle, octagon, circle, and made with additional ornamental shapes thereon and there can be additional ornamental and functional shapes made on the main section, and the outward-facing surface of the main section is made with an ornamental expression that is either built thereon or is added thereon.

In still another of the embodiments, additional functional shapes, such as a hook or a ring, are made onto the main section of the attachment of an eyewear frame system as mentioned above. When a pair of such attachments are applied to both temple pieces of the eyewear, a string can be fastened to the hooks or rings on both attachments such that it serves as a retainer of the eyewear, when it is not in use, on the neck of a person wearing the eyewear.

It is an object of the present invention to provide a secure yet reversible/removable means to attach a decorative element/accessory to one or both of the temple pieces of an eyewear. The decoration thus attach to the eyewear can be of different designs of shapes, colors, patterns, wordings and drawings.

It is another object of the present invention to provide a means as a retainer of the eyewear to the neck of a wearer of the eyewear, when it is not in use.

DESCRIPTION OF THE PREFERRED EMBODIMENTS

Figure 1:
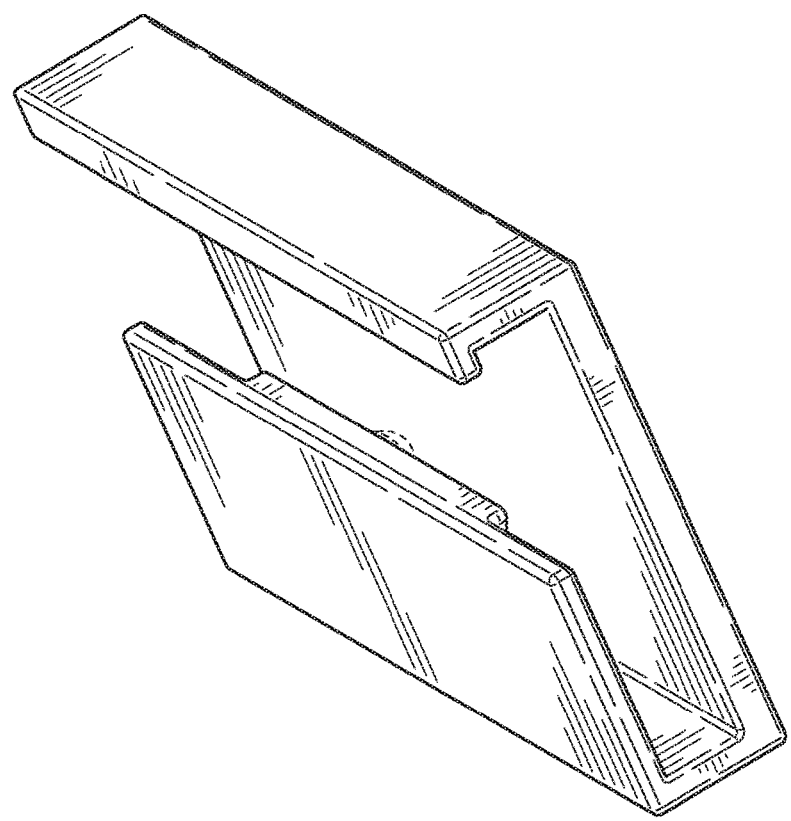
FIG. 1 shows a top perspective view of the second embodiment of the invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

In each of the below embodiments, the attachment or decorative attachment may be present on one or both temple (s) of the eyewear. In some instances, two attachments may be present on each of both of the temple(s). In yet other instances, three or more attachments may be utilized in such a fashion.

Figure 28:
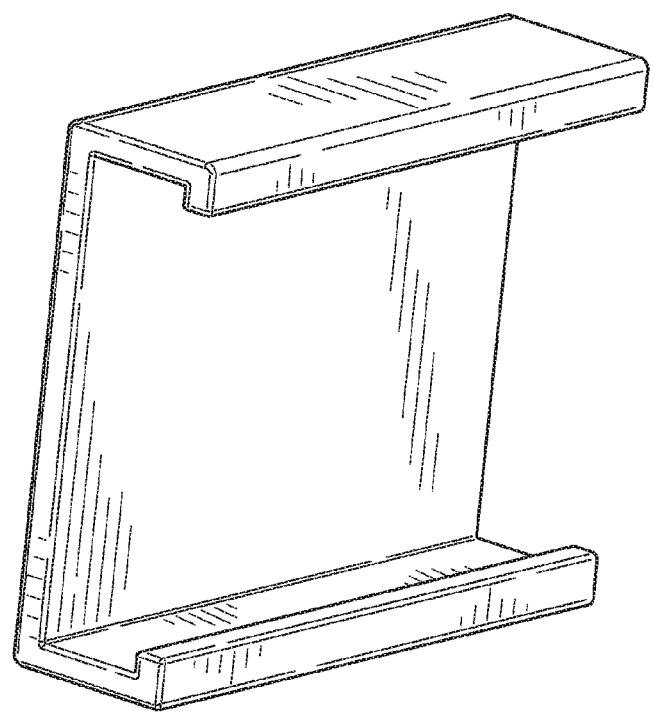
FIG. 28 shows a back perspective view of the first embodiment of the invention.

Referring now to the first embodiment of the present invention, shown in FIGS. 28-34, among which FIG. 28 shows a back perspective view of this embodiment. As shown, the attachment consists of a main section, which has a top edge and a bottom edge, and each of the two edges has a first extension of a range of 2 to 7 mm, and preferably about 4 mm, toward the back side of the main section and both first extensions are perpendicular to the main section. At the end edge of each of the first extensions, there further is a second extension of a range of 1 to 5 mm, and preferably about 2 mm, which is perpendicular to the first extension and the two second extensions are along the direction of facing towards each other. As a result, the first embodiment of the invention, when viewed from the side, is shaped as a letter C with both extensions on the top and bottom edges of the main section forming two parallel channels, which is of, preferably, about 4 mm in width and about 2 mm in depth (see FIGS. 28 and 31-32).

These two channels of the first embodiment of the invention are intended to accommodate a flat eyewear temple of a particular width and to help grip the top and bottom side edges of such a flat eyewear temple. The decorative attachment of the first embodiment of the present invention is intended to be securely held onto a temple piece of an eyewear by the friction between the attachment inner surfaces and the outer surface of the temple piece, as well as the gripping force arisen from properly selecting the distance between the two channels and the width of each channel to be slightly smaller than the width and thickness of the temple piece. This slight mismatch should be just enough so that while the attachment can slide onto the temple piece without too much difficulty, the slightly outward bending of the two channels generates the needed gripping force to help secure the attachment on the temple piece. In an alternative embodiment of the present invention, the second extensions are not perpendicular to the first extensions. Instead, they are extended more towards the back side of the main section such that the edges of the second extensions further press on the inner side of the temple to exert additional pressure on the temple inner surface for added gripping force.

The attachment of the first embodiment of the invention is made of a solid hard-surfaced thermoplastic material, selected from a group consisting of polycarbonate, polyethylene, acrylonitrile butadiene styrene (ABS), or nylon with or without a heat finish. The thermoplastic material can be opaque, translucent or transparent, or of a solid color or multiple solid colors or color patterns, as needed.

Figure 29:
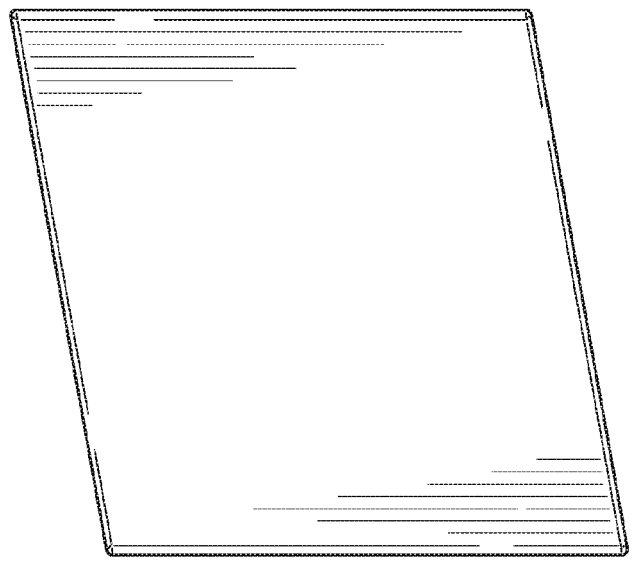
FIG. 29 shows a front view of the first embodiment of the invention.
Figure 30:
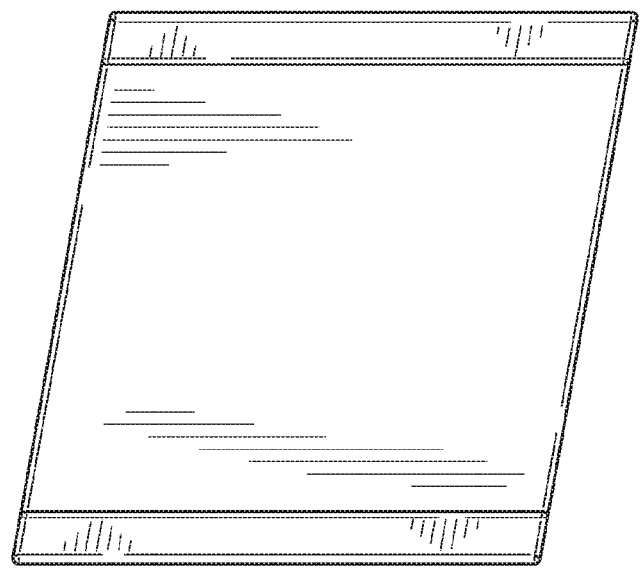
FIG. 30 shows a back view of the first embodiment of the invention.
Figures 31, 32:
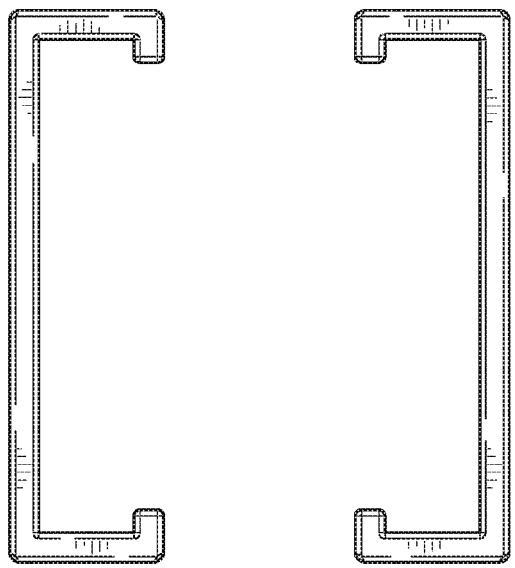
FIG. 31 shows a right side view of the first embodiment of the invention.
FIG. 32 shows a left side view of the first embodiment of the invention.
Figure 33:
FIG. 33 shows a top side view of the first embodiment of the invention.
Figure 34:
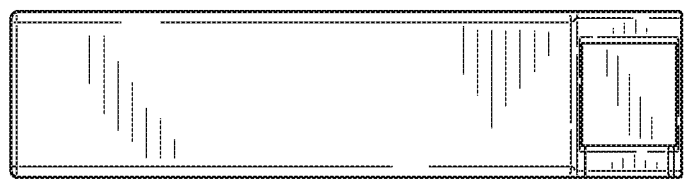
FIG. 34 shows a bottom side view of the first embodiment of the invention.

The decorative attachment of the first embodiment of the invention is intended to bear an ornamental expression on the front surface of its main section and further to have, when being properly put onto a temple of an eyewear, this front surface bearing the ornamental expression facing outwards on the temple piece so as for the ornamental expression be visible to and catch the attention of viewers in the vicinity of the person wearing the eyewear. The main section of the first embodiment of the invention can be of various shapes, selected from the group consisting of square, rectangle, trapezoid and parallelogram (as shown in FIG. 29), or any other suitable shape as desired. The ornamental expression can be made as a part of the main section surface at the same time and in the same process when the decorative attachment of the first embodiment of the invention is made. In an alternative embodiment, an ornamental expression can be added to the front surface of the main section through means such as carving, etching, inkjet or LogoJet printing with or without a flexible or rigid finish, or engraving. In yet another alternative embodiment, an ornamental expression can be added onto the front surface of the main section through further fastening another decorative object bearing the desired ornamental expression onto the front surface of the main section by using adhesives or other means.

FIGS. 30-34 show various views of the first embodiment of the present invention with its main section in the shape of a parallelogram (as shown in FIG. 29).

Referring now to the second embodiment of the present invention, shown in FIGS. 1-7, among which FIG. 1 shows a top (back) perspective view of this embodiment. As shown, the attachment consists of a main section, which has a top edge and a bottom edge, and each of the two edges has a first extension of a range of 2 to 7 mm, and preferably about 4 mm, toward the back side of the main section and both first extensions are perpendicular to the main section. At the end edge of the first extension on the top edge of the main section, there further is a second extension of a range of 1 to 5 mm, and preferably about 2 mm, which is perpendicular to the first top extension. This second top extension is extended downwards. At the end edge of the first extension on the bottom edge of the main section, there further is a second extension of a range of 1 to 7 mm, and preferably about 6 mm, which is perpendicular to the first bottom extension. This second bottom extension is extended upwards. At the end edge of the second bottom extension, there further is a third extension tongue of a range of 0.5 to 4 mm, and preferably a range of 0.5 to 2 and more preferably, about 1 mm, which is perpendicular to the second bottom extension. This third extension tongue is extended towards the back of the main section. As a result, both extensions on the top and bottom edges of the main section of the second embodiment of the present invention form two parallel channels with the inside wall of the bottom channel further containing a side-facing tongue on one sidewall of the bottom channel (see FIGS. 1 and 4-5).

Figure 8:
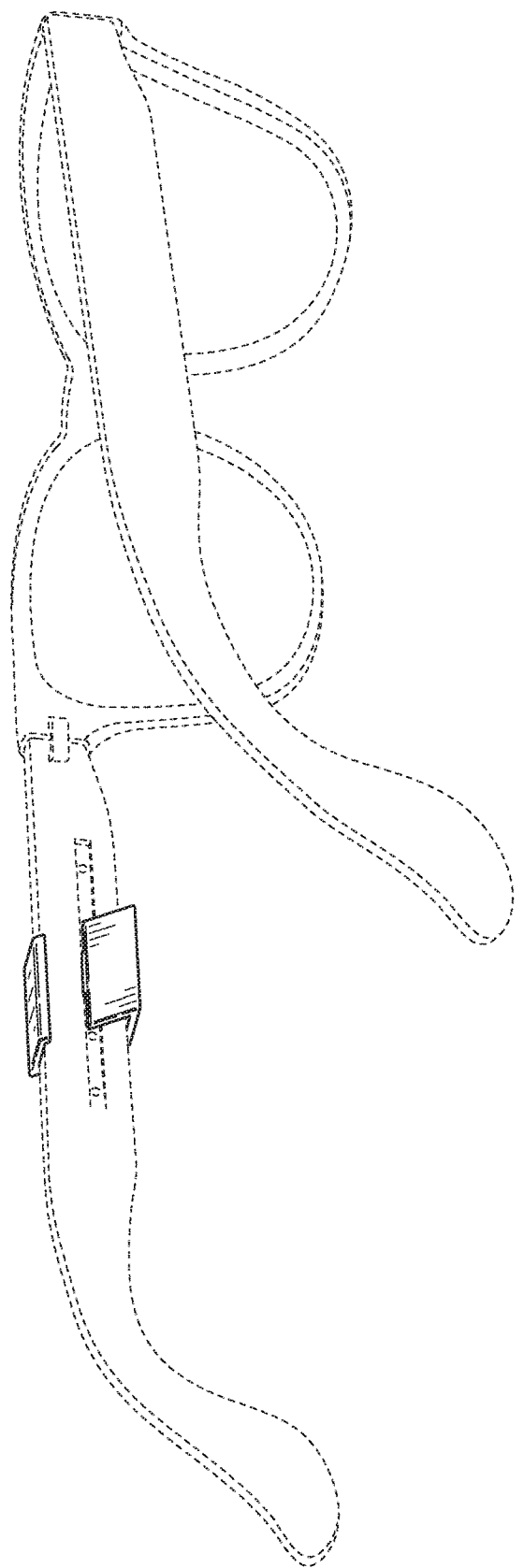
FIG. 8 shows a perspective view from the back of the second embodiment of the invention engaging a left temple of an eyewear.

These two channels of the second embodiment of the invention are intended to accommodate a flat eyewear temple of a particular width and to help grip the top and bottom side edges of such a flat eyewear temple. Further, the decorative attachment of the second embodiment of the invention is intended to be securely held onto a temple piece of an eyewear not only by the friction between the attachment inner surfaces and the outer surface of the temple piece, as well as the gripping force arisen from properly selecting the distance between the two channels and the width of each channel to be slightly smaller than the width and thickness of the temple piece, as discussed above, but also by a locking mechanism involving a groove (matching the third extension tongue in shape and depth) built into the temple piece of the eyewear (as shown in FIG. 8). In an alternative embodiment of the present invention, the second bottom extension of the second embodiment of the invention is not perpendicular to the first bottom extension. Instead, it is extended more towards the back side of the main section such that the third extension tongue further presses into the receiving groove on the temple to exert additional pressure on the temple for added gripping force.

The attachment of the second embodiment of the invention is made of a solid hard-surfaced thermoplastic material, selected from a group consisting of polycarbonate, polyethylene, acrylonitrile butadiene styrene (ABS), or nylon with or without a heat finish. The thermoplastic material can be opaque, translucent or transparent, or of a solid color or multiple solid colors or color patterns, as needed.

Figure 2:
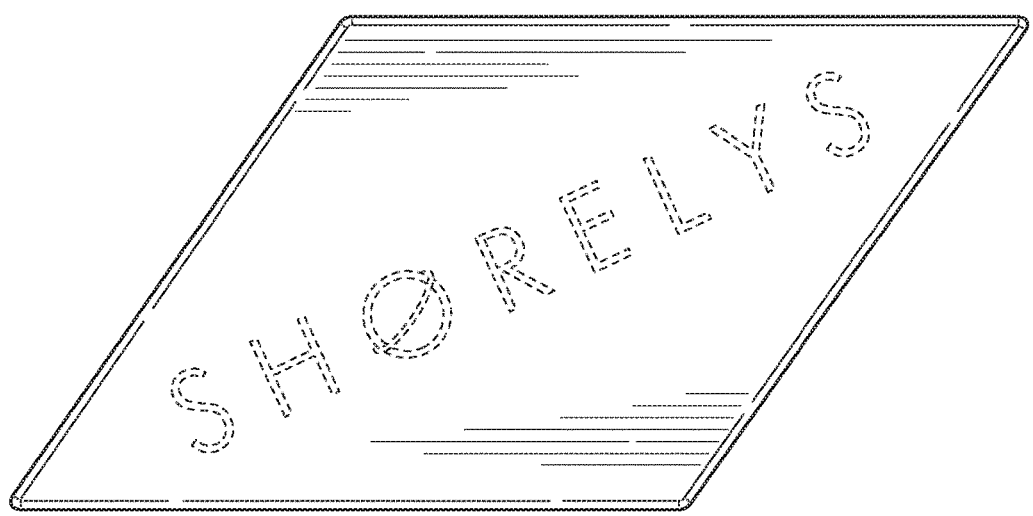
FIG. 2 shows a front view of the second embodiment of the invention.
Figure 3:
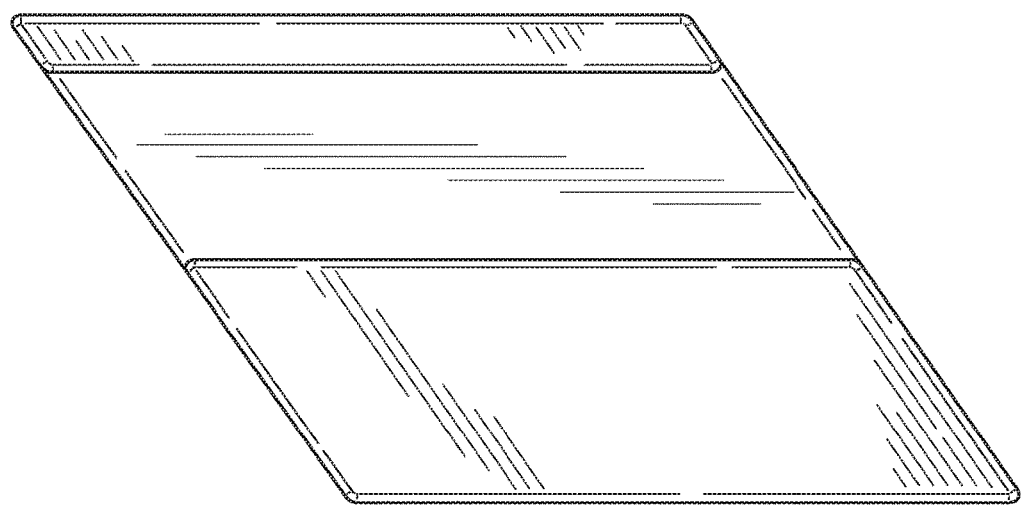
FIG. 3 shows a back view of the second embodiment of the invention.
Figure 4:
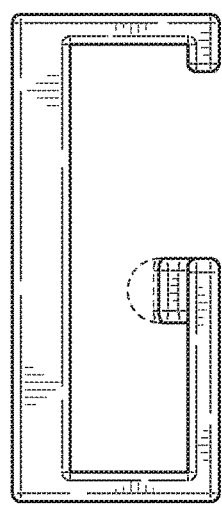
FIG. 4 shows a right side view of the second embodiment of the invention.
Figure 5:
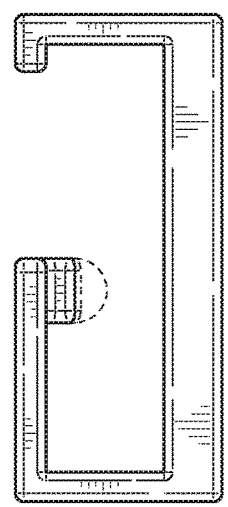
FIG. 5 shows a left side view of the second embodiment of the invention.
Figure 6:
FIG. 6 shows a top side view of the second embodiment of the invention.
Figure 7:
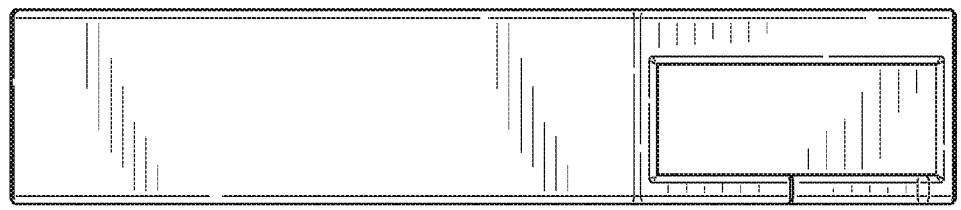
FIG. 7 shows a bottom side view of the second embodiment of the invention.
Figure 9:
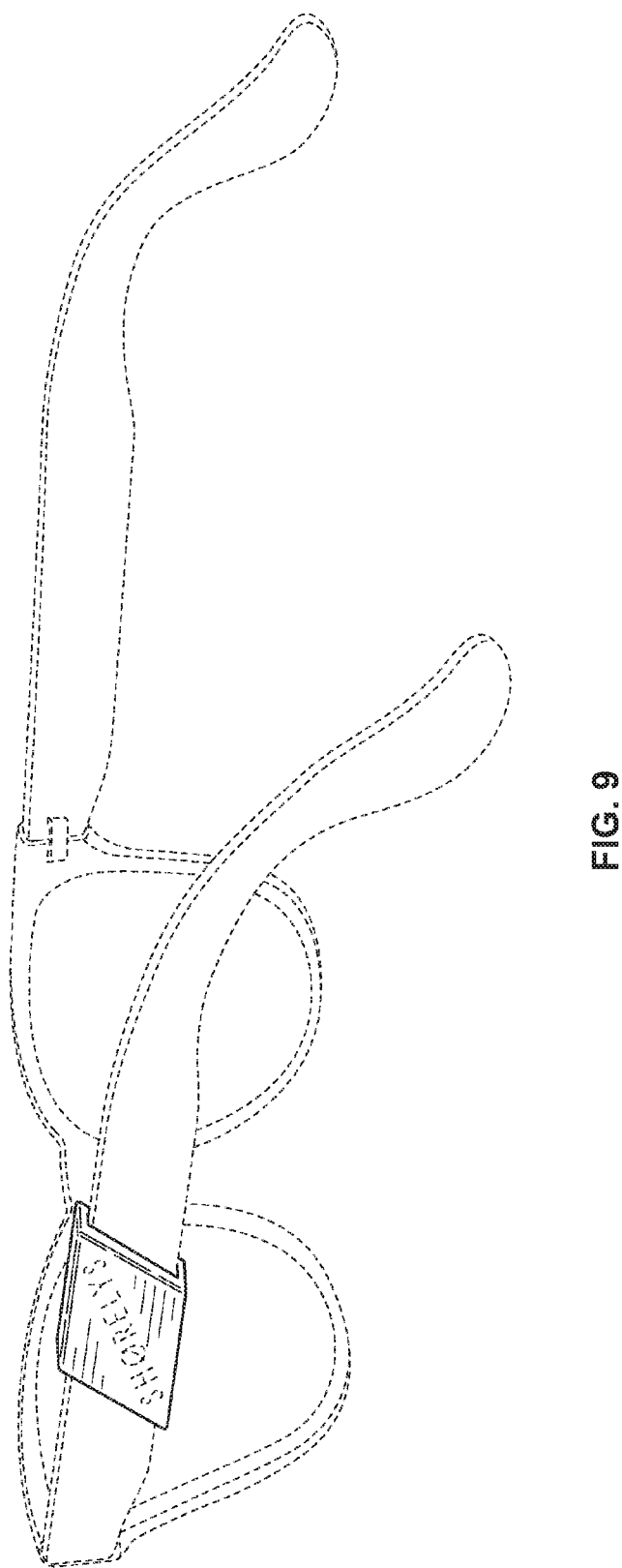
FIG. 9 shows a perspective view from the front of the second embodiment of the invention engaging a left temple of an eyewear.

The decorative attachment of the second embodiment of the invention is intended to bear an ornamental expression on the front surface of its main section and further to have, when being properly put onto a temple of an eyewear, this front surface bearing the ornamental expression facing outwards on the temple piece so as for the ornamental expression be visible to and catch the attention of viewers in the vicinity of the person wearing the eyewear (as shown in FIG. 9). The main section of the second embodiment of the invention can be of various shapes, selected from the group consisting of square, rectangle, trapezoid and parallelogram (as shown in FIG. 2 with an ornamental expression), or any other suitable shape as desired. The ornamental expression can be made as a part of the main section surface at the same time and in the same process when the decorative attachment of the second embodiment of the invention is made. In an alternative embodiment, an ornamental expression can be added to the front surface of the main section through means such as carving, etching, inkjet or LogoJet printing with or without a flexible or rigid finish, or engraving. In yet another alternative embodiment, an ornamental expression can be added onto the front surface of the main section through further fastening another decorative object bearing the desired ornamental expression onto the front surface of the main section by using adhesives or other means.

FIGS. 3-7 show various views of the second embodiment of the present invention with its main section in the shape of a parallelogram (as shown in FIG. 2).

Figure 10:
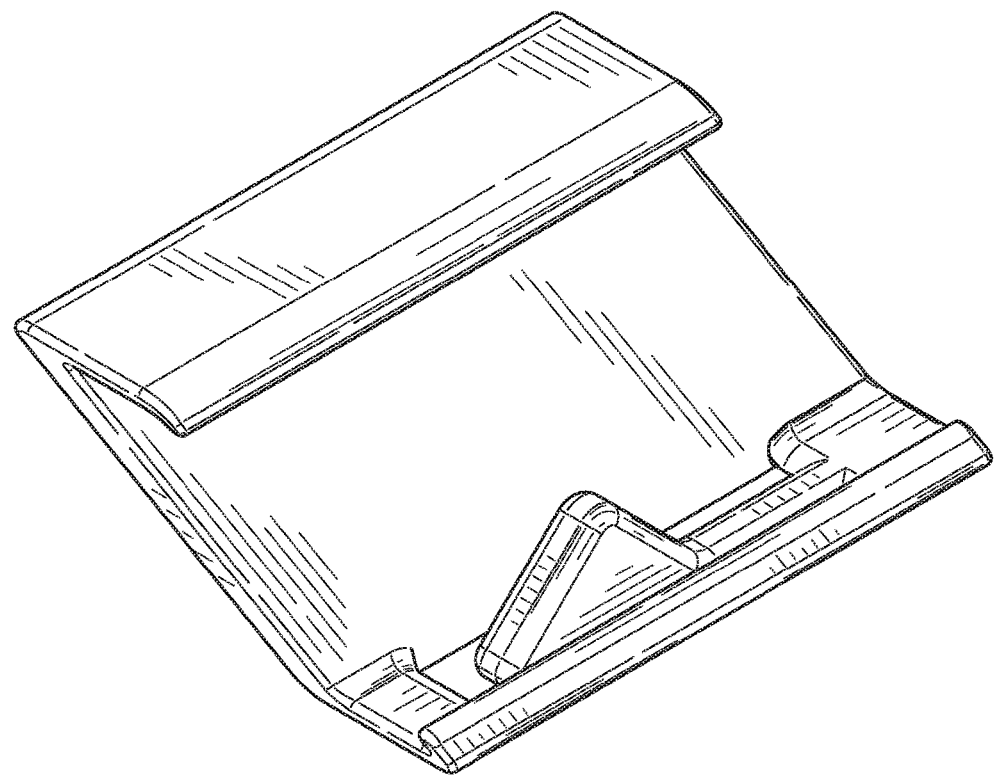
FIG. 10 shows a back perspective view of the third embodiment of the invention.

Referring now to the third embodiment of the present invention, shown in FIGS. 10-16, among which FIG. 10 shows a top (back) perspective view of this embodiment. As shown, the attachment consists of a main section, which has a top edge and a bottom edge, and each of the two edges has a first extension of a range of 2 to 7 mm, and preferably about 4 mm, toward the back side of the main section and both first extensions are perpendicular to the main section. At the end edge of each of the first extensions, there further is a second extension of 1 to 5 mm, and preferably about 2 mm, which is perpendicular to the first extension and the two second extensions are along the direction of facing towards each other. As a result, the third embodiment of the present invention, when viewed from the side, is generally shaped as a letter C with both extensions on the top and bottom edges of the main section forming two parallel channels. Furthermore, the mid-section of the first bottom extension is constructed to contain an opening to accommodate an upward-facing latch built in the first bottom extension, extending upward in the bottom channel (see FIGS. 10 and 13-14).

Figure 17:
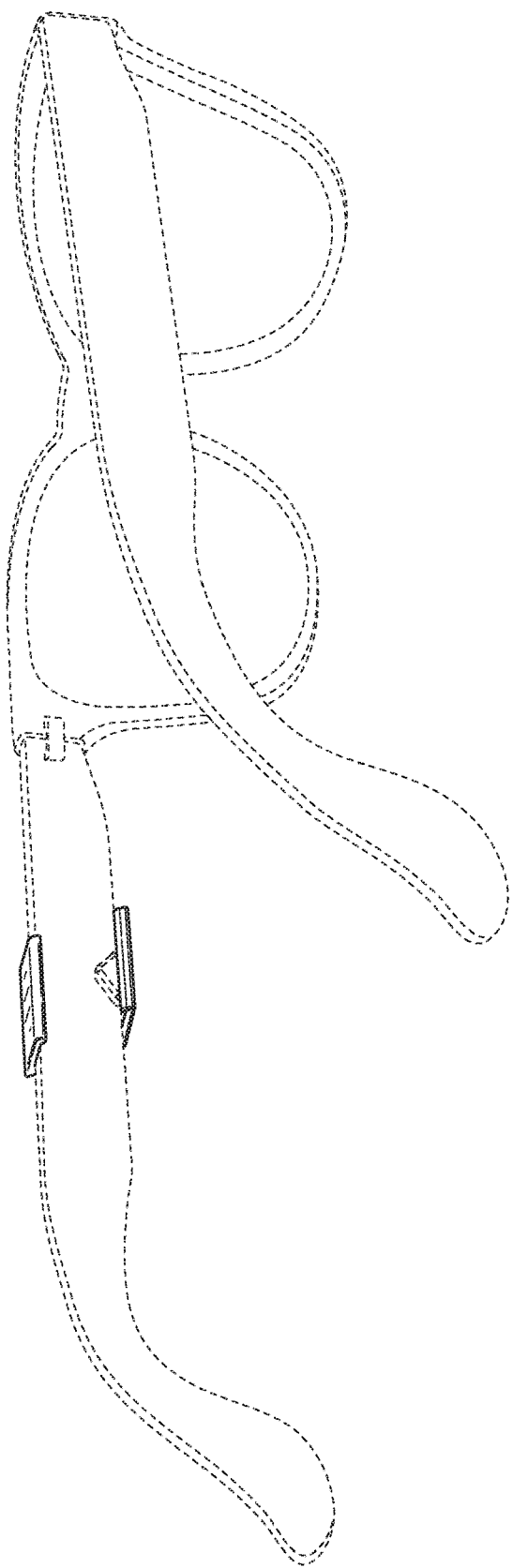
FIG. 17 shows a perspective view from the back of the third embodiment of the invention engaging a left temple of an eyewear.

These two channels of the third embodiment of the invention are intended to accommodate a flat eyewear temple of a particular width and to help grip the top and bottom side edges of such a flat eyewear temple. Further, the decorative attachment of the third embodiment of the invention is intended to be securely held onto a temple piece of an eyewear not only by the friction between the attachment inner surfaces and the outer surface of the temple piece, as well as the gripping force arisen from properly selecting the distance between the two channels and the width of each channel to be slightly smaller than the width and thickness of the temple piece, as discussed above, but also by an inter-locking mechanism involving an aperture (matching the aforementioned latch in shape and depth) built into the bottom side of the temple piece of the eyewear to accommodate and lock the latch (as shown in FIG. 17).

The attachment of the third embodiment of the invention is made of a solid hard-surfaced thermoplastic material, selected from a group consisting of polycarbonate, polyethylene, acrylonitrile butadiene styrene (ABS), or nylon with or without a heat finish. The thermoplastic material can be opaque, translucent or transparent, or of a solid color or multiple solid colors or color patterns, as needed.

Figure 11:
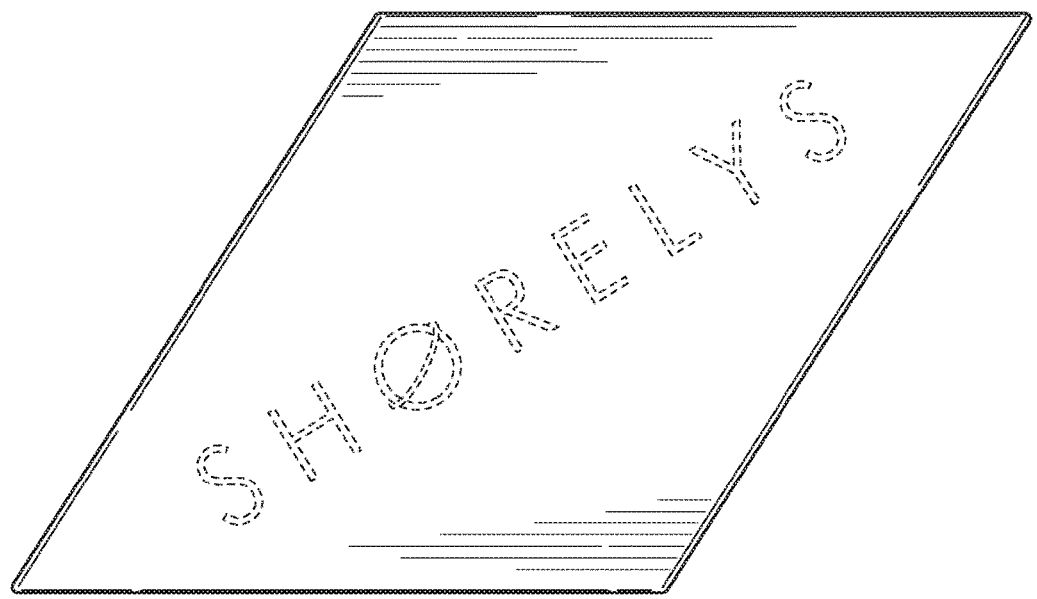
FIG. 11 shows a front view of the third embodiment of the invention.
Figure 12:
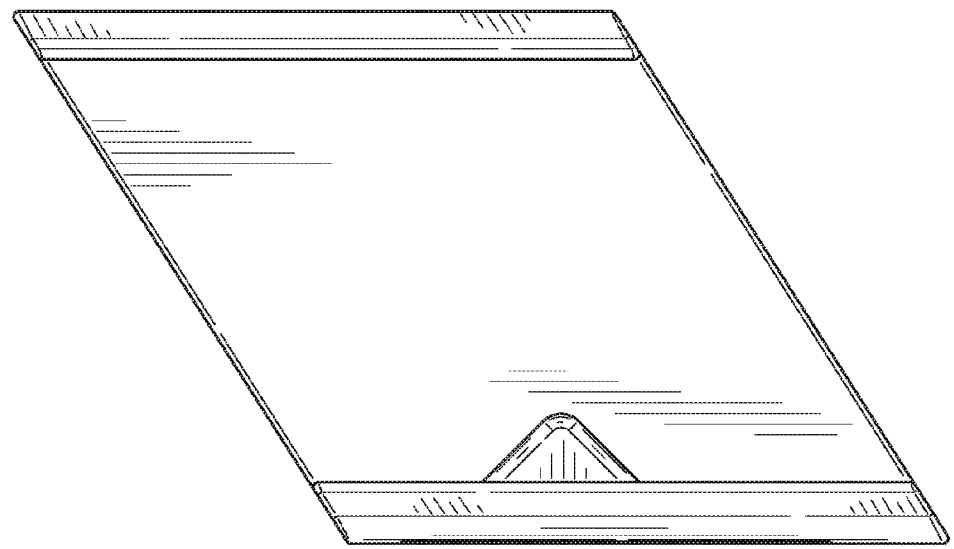
FIG. 12 shows a back view of the third embodiment of the invention.
Figure 13:
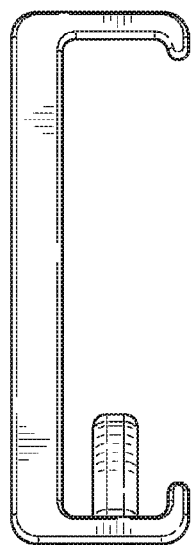
FIG. 13 shows a right side view of the third embodiment of the invention.
Figure 14:
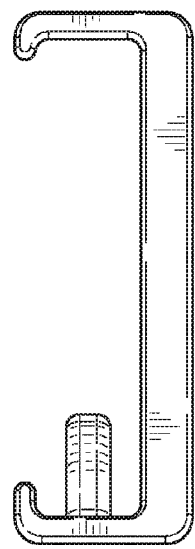
FIG. 14 shows a left side view of the third embodiment of the invention.
Figure 15:
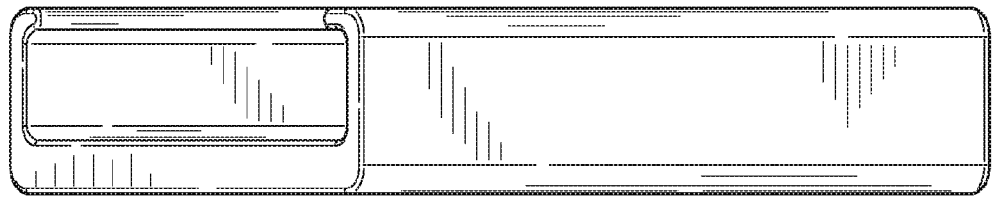
FIG. 15 shows a top side view of the third embodiment of the invention.
Figure 16:
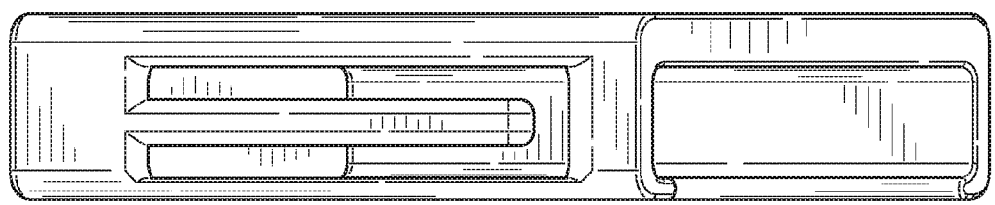
FIG. 16 shows a bottom side view of the third embodiment of the invention.
Figure 18:
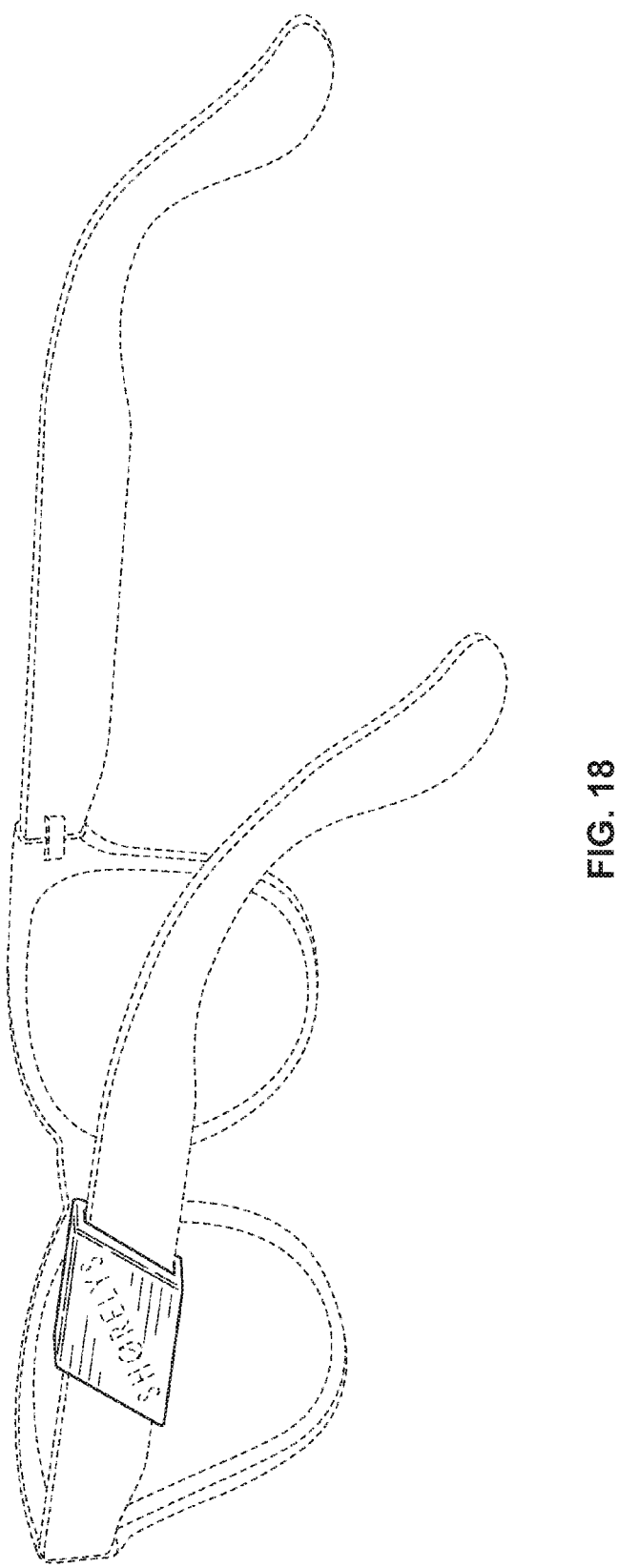
FIG. 18 shows a perspective view from the front of the third embodiment of the invention engaging a left temple of an eyewear.
Figure 19:
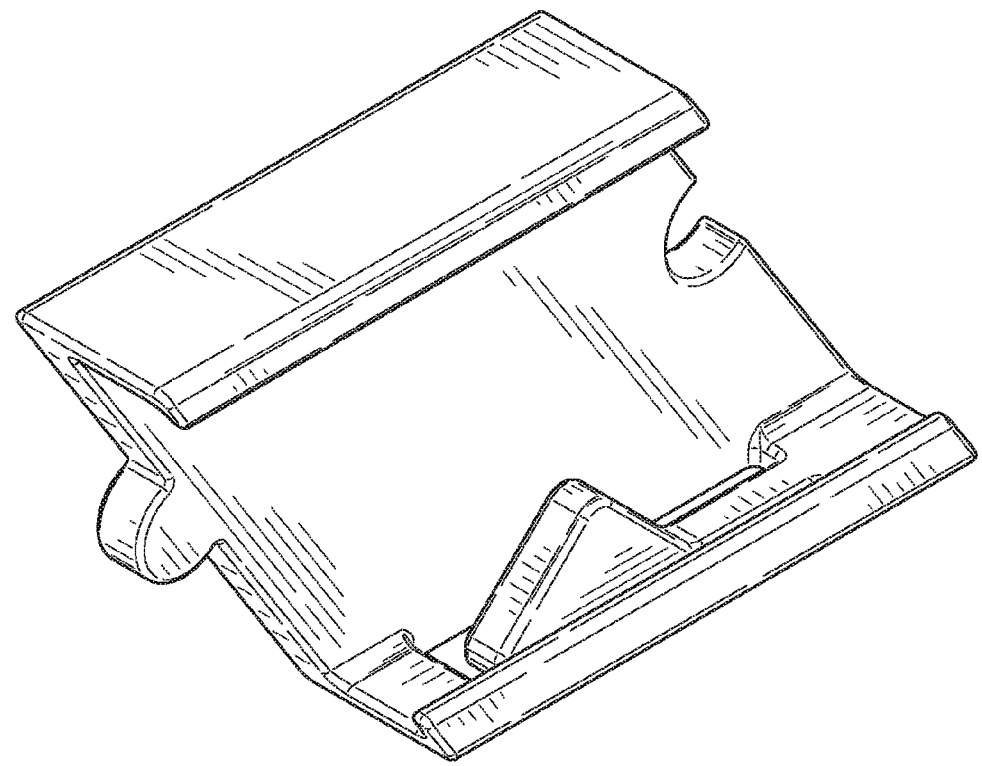
FIG. 19 shows a back perspective view of the fourth embodiment of the invention.

The decorative attachment of the third embodiment of the invention is intended to bear an ornamental expression on the front surface of its main section and further to have, when being properly put onto a temple of an eyewear, this front surface bearing the ornamental expression facing outwards on the temple piece so as for the ornamental expression be visible to and catch the attention of viewers in the vicinity of the person wearing the eyewear (as shown in FIG. 18). The main section of the third embodiment of the invention can be of various shapes, selected from the group consisting of square, rectangle, trapezoid and parallelogram (as shown in FIG. 11 with an ornamental expression), or any other suitable shape as desired. The ornamental expression can be made as a part of the main section surface at the same time and in the same process when the decorative attachment of the third embodiment of the invention is made. In an alternative embodiment, an ornamental expression can be added to the front surface of the main section through means such as carving, etching, inkjet or LogoJet printing with or without a flexible or rigid finish, or engraving. In yet another alternative embodiment, an ornamental expression can be added onto the front surface of the main section through further fastening another decorative object bearing the desired ornamental expression onto the front surface of the main section by using adhesives or other means.

FIGS. 12-16 show various views of the third embodiment of the present invention with its main section in the shape of a parallelogram (as shown in FIG. 11).

The fourth embodiment of the present invention is very similar to the aforementioned third embodiment with the exception that the shape of the main section of the attachment further contains additional ornamental design (one half-circled notch on one side of the main section and one half-circled protrusion on the other side.

Thus, referring now to the fourth embodiment of the present invention, shown in FIGS. 18-25, among which FIG. 18 shows a top (back) perspective view of this embodiment. As shown, the attachment consists of a main section, which has a top edge and a bottom edge, and each of the two edges has a first extension of a range of 2 to 7 mm, and preferably about 4 mm, toward the back side of the main section and both first extensions are perpendicular to the main section. At the end edge of each of the first extensions, there further is a second extension of 1 to 5 mm, and preferably about 2 mm, which is perpendicular to the first extension and the two second extensions are along the direction of facing towards each other. As a result, the fourth embodiment of the present invention, when viewed from the side, is generally shaped as a letter C with both extensions on the top and bottom edges of the main section forming two parallel channels. Furthermore, the mid-section of the first bottom extension is constructed to contain an opening to accommodate an upward-facing latch built in the first bottom extension, extending upward in the bottom channel (see FIGS. 18 and 22-23).

Figure 26:
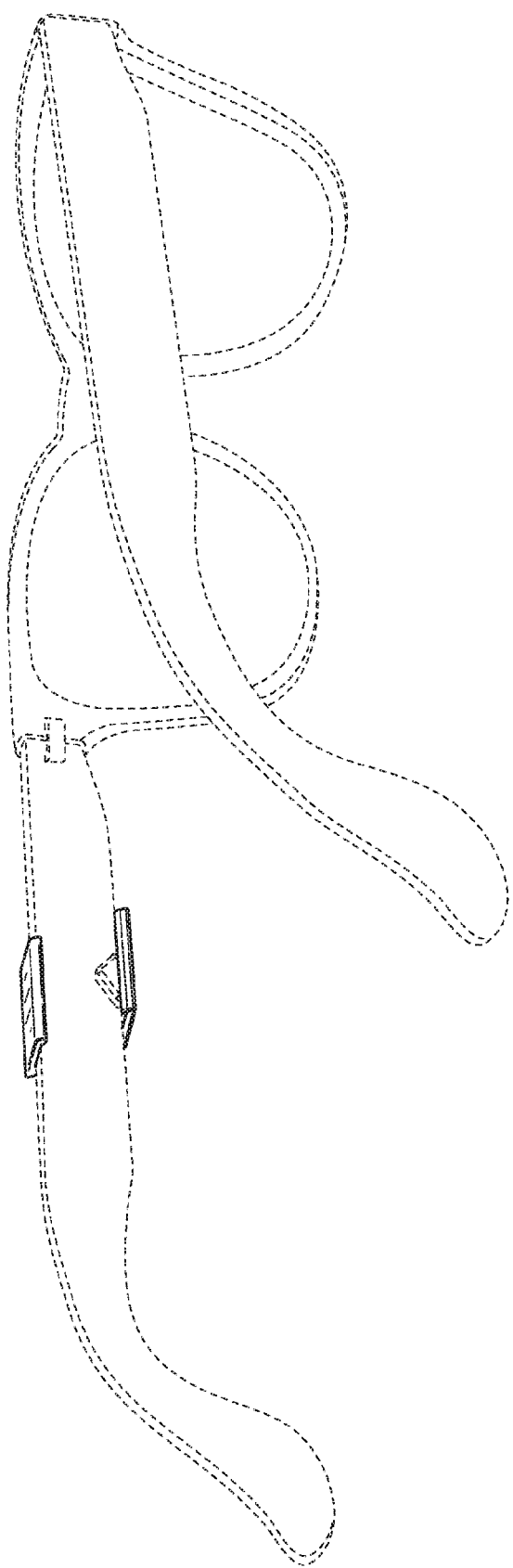
FIG. 26 shows a perspective view from the back of the fourth embodiment of the invention engaging a left temple of an eyewear.

These two channels of the fourth embodiment of the invention are intended to accommodate a flat eyewear temple of a particular width and to help grip the top and bottom side edges of such a flat eyewear temple. Further, the decorative attachment of the fourth embodiment of the invention is intended to be securely held onto a temple piece of an eyewear not only by the friction between the attachment inner surfaces and the outer surface of the temple piece, as well as the gripping force arisen from properly selecting the distance between the two channels and the width of each channel to be slightly smaller than the width and thickness of the temple piece, as discussed above, but also by an inter-locking mechanism involving an aperture (matching the aforementioned latch in shape and depth) built into the bottom side of the temple piece of the eyewear to accommodate and lock the latch (as shown in FIG. 26).

The attachment of the fourth embodiment of the invention is made of a solid hard-surfaced thermoplastic material, selected from a group consisting of polycarbonate, polyethylene, acrylonitrile butadiene styrene (ABS), or nylon with or without a heat finish. The thermoplastic material can be opaque, translucent or transparent, or of a solid color or multiple solid colors or color patterns, as needed.

Figure 20:
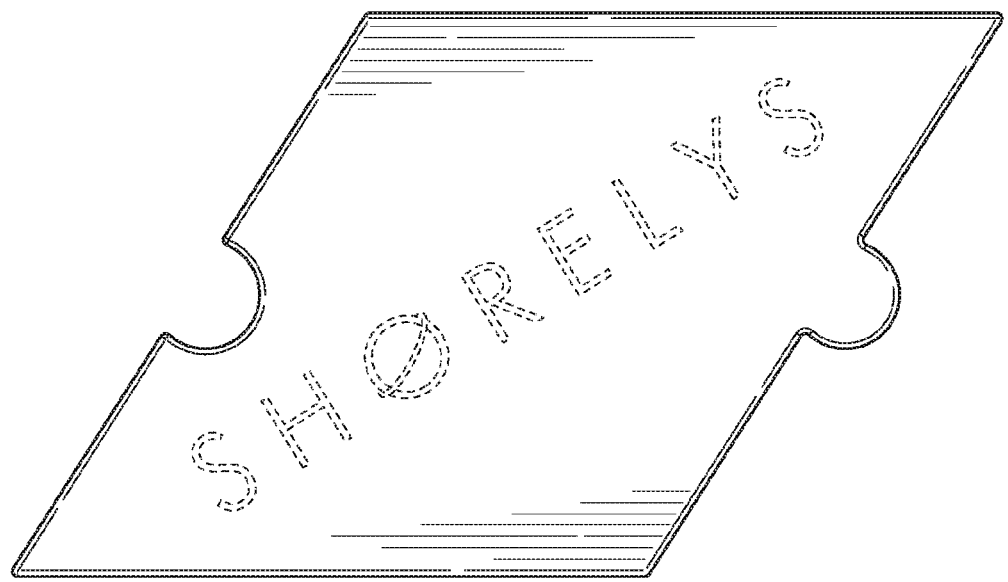
FIG. 20 shows a front view of the fourth embodiment of the invention.
Figure 21:
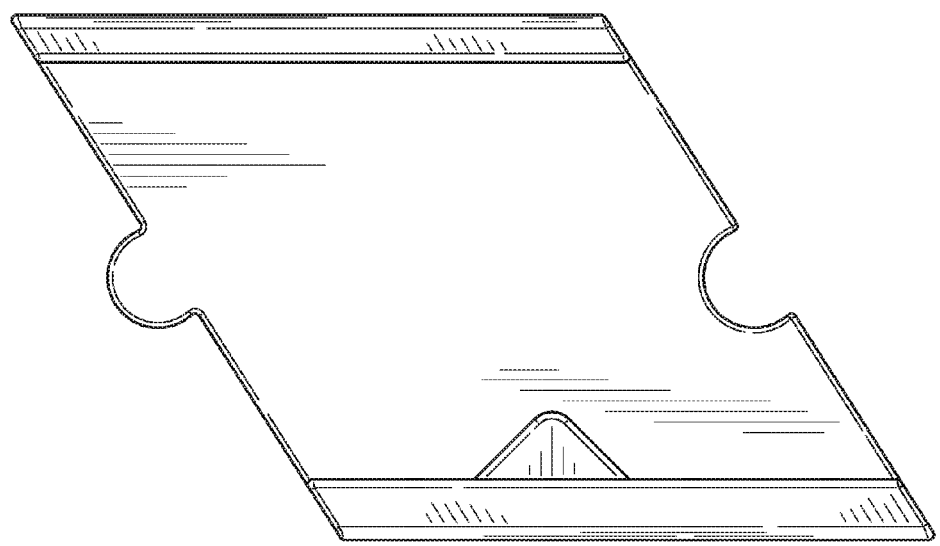
FIG. 21 shows a back view of the fourth embodiment of the invention.
Figure 22:
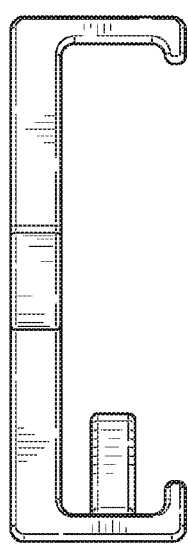
FIG. 22 shows a right side view of the fourth embodiment of the invention.
Figure 23:
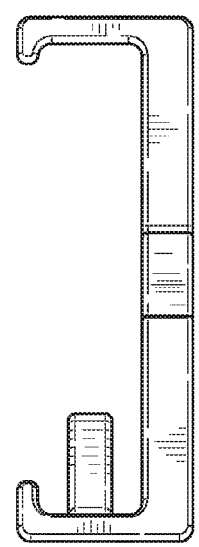
FIG. 23 shows a left side view of the fourth embodiment of the invention.
Figure 24:
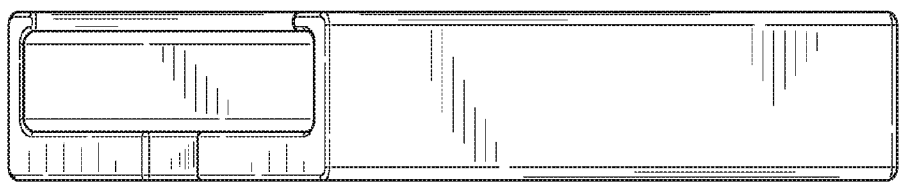
FIG. 24 shows a top side view of the fourth embodiment of the invention.
Figure 25:
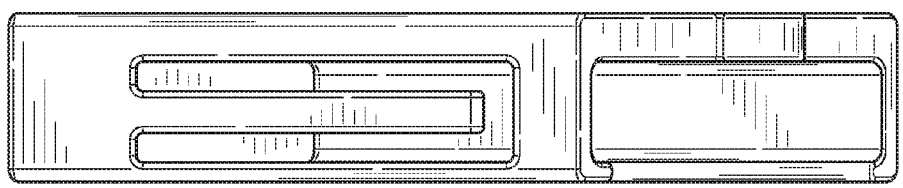
FIG. 25 shows a bottom side view of the fourth embodiment of the invention.
Figure 27:
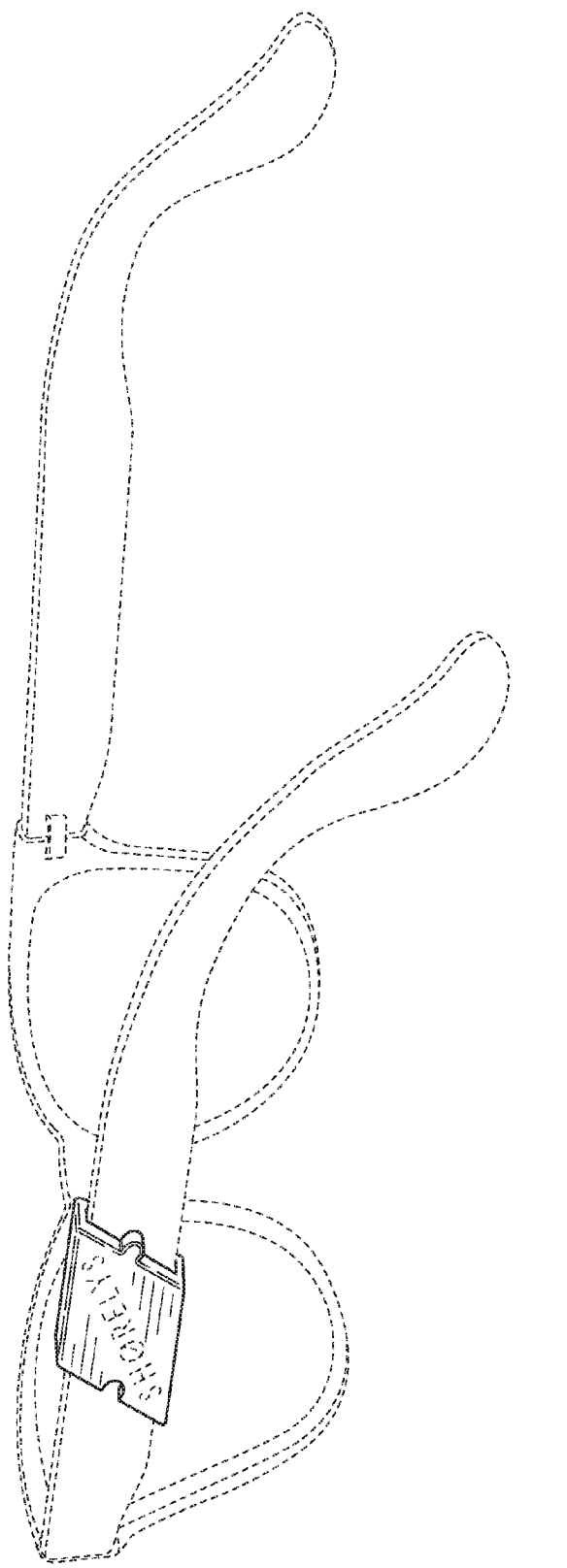
FIG. 27 shows a perspective view from the front of the fourth embodiment of the invention engaging a left temple of an eyewear.

The decorative attachment of the fourth embodiment of the invention is intended to bear an ornamental expression on the front surface of its main section and further to have, when being properly put onto a temple of an eyewear, this front surface bearing the ornamental expression facing outwards on the temple piece so as for the ornamental expression be visible to and catch the attention of viewers in the vicinity of the person wearing the eyewear (as shown in FIG. 27). The main section of the fourth embodiment of the invention can be of various general shapes, selected from the group consisting of square, rectangle, trapezoid and parallelogram, or any other suitable shape as desired. Furthermore, the shape of the main section of this embodiment can contain additional ornamental design (in this case, one half-circled notch on one side of the main section and one half-circled protrusion on the other side, as shown in FIG. 20 with an ornamental expression). The ornamental expression can be made as a part of the main section surface at the same time and in the same process when the decorative attachment of the third embodiment of the invention is made. In an alternative embodiment, an ornamental expression can be added to the front surface of the main section through means such as carving, etching, inkjet or LogoJet printing with or without a flexible or rigid finish, or engraving. In yet another alternative embodiment, an ornamental expression can be added onto the front surface of the main section through further fastening another decorative object bearing the desired ornamental expression onto the front surface of the main section by using adhesives or other means.

FIGS. 21-25 show various views of the first embodiment of the present invention with its main section in the shape of a parallelogram with the aforementioned additional ornamental design (as shown in FIG. 20).

In yet another embodiment of the invention, two attachments are applied to both temple pieces of an eyewear and the main section of the attachments are made with additional functional shapes thereon, such as a hook, or a ring. To these hooks (or rings) on both attachments is fastened a string, which serves as a retainer of the eyewear, when it is not in use, on the neck of a wearer of the eyewear.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A detachable decorative attachment for a temple of an eyewear, comprising:
    a main section having a top edge and a bottom edge;
    two first extensions disposed on the top edge and the bottom edge of the main section, and each of the first extensions are perpendicular to the main section extending toward a back side;
        wherein at an end edge of each of the first extensions, there further is a second extension that is perpendicular to the first extension and the two second extensions are facing towards each other,
        wherein the main section, the first extensions, and second extensions form two channel sections disposed on a top and a bottom sides of the main section for gripping a top edge and a bottom edge of the temple of the eyewear when the attachment is clipped onto the temple, and
        wherein an outside surface of the main section faces outward when the attachment is clipped onto the temple and the outward-facing surface of the main section has a decorative shape and upon the outward-facing surface of the main section, an ornamental expression is applied or integrated; and
        wherein the attachment is fastened onto the temple through friction between an inside surface of the attachment and at least two outer surfaces of the temple.

2. The attachment according to claim 1, wherein the attachment is fastened through a tension force exerted by an edge of a sidewall of the two channel sections constructed to press against an inside surface of the temple.

3. The attachment according to claim 1, the attachment is made of a thermoplastic material that is opaque, translucent or transparent, or has a solid color or multiple solid colors or color patterns.

4. The attachment according to claim 1, wherein the attachment is made of a thermoplastic material selected from a group consisting of polycarbonate, polyethylene, acrylonitrile butadiene styrene (ABS), or nylon with or without a heat finish.

5. The attachment according to claim 1, wherein the main section is made into a general shape selected from a group consisting of square, trapezoid, rectangle, parallelogram, or a combination thereof.

6. The attachment according to claim 1, wherein the outward-facing surface of the main section has an ornamental expression having an aperture thereon to which a decorative element is selectively inserted.

7. A detachable decorative attachment for a temple of an eyewear, comprising
    a main section having a top edge and a bottom edge;
    two first extensions that are disposed on the top edge and the bottom edge of the main section, and each of the first extension is perpendicular to the main section extending toward the back side;
        wherein at the end edge of each of the first extensions, there further is a second extension that is perpendicular to the first extension and the two second extensions are facing towards each other,
        wherein the main section, the first extensions, and second extensions form two channel sections disposed on a top a bottom sides of the main section for gripping a top edge and a bottom edge of the temple of the eyewear when the attachment is clipped onto the temple, and
        wherein there is an engagement mechanism interacting between the attachment and the temple so as to retain the attachment onto the temple, and wherein an outside surface of the main section faces outward when the attachment is clipped onto the temple and the outward-facing surface of the main section has a decorative shape and upon the outward-facing surface of the main section, an ornamental expression is applied or integrated; and
        wherein the engagement mechanism is built into the channel section on the bottom side or the top side of the main section to interact with a receiving engagement mechanism formed on a surface on the temple.

8. The attachment according to claim 7, wherein the engagement mechanism comprises a tongue extended from a top edge of the bottom channel towards a groove built into the inside surface of the temple.

9. The attachment according to claim 7, wherein said engagement mechanism comprises a latch extended from within the bottom first extension on the attachment towards an aperture built into the bottom side of the temple.

10. The attachment according to claim 7, wherein the attachment is made of a thermoplastic material that is opaque, translucent or transparent, or has a solid color or multiple solid colors or color patterns.

11. The decorative attachment according to claim 7, wherein the main section is made into a general shape selected from a group consisting of square, trapezoid, rectangle, parallelogram, or a combination thereof, and made with additional ornamental shapes thereon, and wherein the outward-facing surface of the main section is made with an ornamental expression that is built thereon.

12. The decorative attachment according to claim 11, wherein the outward-facing surface of the main section has an ornamental expression that is added through a means comprising: carving, etching or engraving; or through further fastening a decorative element thereon; or through having an aperture thereon to which a decorative element is selectably inserted.

13. An eyewear frame system having a decorative element affixed to one or both of the temple pieces, comprising:
    an eyewear lens frame;
    a pair of temple pieces, each having a proximal end pivotally attached to an opposing respective side of the lens frame; and
    a detachable decorative attachment for one or both of the temple pieces comprising,
        a main section having a top edge and a bottom edge;
        two first extensions that are disposed on the top edge and the bottom edge of the main section, and each of the first extension is perpendicular to the main section extending toward the back side;

wherein at the end edge of each of the first extensions, there further is a second extension and the second extensions are facing towards each other, wherein the main section, the first extensions, and second extensions form two channel sections disposed on a top and a bottom sides of the main section for gripping a top edge and a bottom edge of the temple of the eyewear when the attachment is clipped onto the temple, and wherein an outside surface of the main section faces outward when the attachment is clipped onto the temple and the outward-facing surface of the main section has a decorative shape and upon the outward-facing surface of the main section, an ornamental expression is applied or integrated; and wherein the attachment has a mechanism has a non-magnetic interaction with the temple.

14. The eyewear frame system according to claim 13, wherein there is provided an engagement mechanism interacting between the attachment and at least one member of the pair of temple pieces so as to retain the attachment onto the temple piece and the engagement mechanism that is built into the bottom channel section of the attachment main section comprises a tongue extended from a top edge of the bottom channel or a bottom edge of the top channel towards a groove built into a surface of at least one member of the pair of temple pieces.

15. The eyewear frame system according to claim 13, wherein there is provided an engagement mechanism interacting between the attachment and at least one member of the pair of temple pieces so as to retain the attachment onto the temple piece and the engagement mechanism that is built into the bottom channel section of the attachment main section comprises a latch extended from within the bottom first extension on the attachment towards an aperture built into the bottom side of the temple.

16. The eyewear frame system according to claim 13, wherein the main section of the attachment is made into a general shape selected from a group consisting of square, trapezoid, rectangle, parallelogram, or a combination thereof and made with additional ornamental and functional shapes thereon, and wherein the outward-facing surface of the main section is made with an ornamental expression that is either built thereon or is added thereon.

17. The eyewear frame system according to claim 13, wherein the two second extensions have a distance between the two extensions smaller than a width of the temple.

18. The eyewear frame system according to claim 13, wherein the two second extensions have a width smaller than the thickness of the temple.

19. The eyewear frame system according to claim 13, wherein the second extensions are non-orthogonal to the first extensions.

* * * * *